# United States Patent Office 2,773,854
Patented Dec. 11, 1956

2,773,854

PLASTICIZED RUBBER COMPOSITIONS

Arthur B. Hersberger, Drexel Hill, and John C. Reid, Wynnewood, Pa., assignors to The Atlantic Refining Company, Philadelphia, Pa., a corporation of Pennsylvania No Drawing. Original application April 4, 1949, Serial No. 85,475, now Patent No. 2,698,280, dated December 28, 1954. Divided and this application July 1, 1953, Serial No. 365,560

1 Claim. (Cl. 260—33.6)

The present invention relates to improved plasticizing and softening agents and rubber-like compositions containing same.

This application is a division of copending application Serial No. 85,475, filed April 4, 1949, now U. S. Patent 2,698,280, entitled "Method of Producing a Plasticizer."

In the processing of rubber-like materials or elastomers, including synthetic polymers and copolymers, it is usually necessary to plasticize and soften these substances prior to subjecting them to various milling and molding operations. These rubber-like materials, such as natural rubber and synthetic polymers, are characterized by having a strong tendency, when stretched or deformed, to return to their original form when the stress is released. Due to this characteristic, it is difficult to process these materials on the mill, and to mold them satisfactorily into shapes which conform accurately to the contours of the mold. Many attempts have been made to overcome this difficulty by the addition of oils, fats, and waxes, petroleum extracts, and tars. Such agents cause the rubber-like materials to flow more easily, and as a result they are more readily processed on the mill, and are more amenable to accurate molding. However, many of these agents do not sufficiently plasticize the rubber-like materials and often tend to impart undesirable characteristics to the finished product. For example, they may reduce tear strength and tensile strength and increase curing time, and they may tend to bloom to the surface, as well as increase milling time and the power required for milling. In other instances, the plasticizing agents may volatilize at temperatures within the vulcanizing or curing temperature range, and may have objectionable odor and toxic properties.

However, we have found that the above difficulties may be overcome by the use of certain fractions derived by the catalytic cracking of hydrocarbon oils, and more particularly the residue and heavy distillate fraction from the cracking of petroleum in the presence of powdered catalyst such as the silica-alumina catalysts currently used in the so-called "fluid" catalytic cracking processes. In such processes, powdered catalyst comprising usually 80 percent to 90 percent silica impregnated with 10 percent to 20 percent alumina are fluidized and injected into the vaporized oil to be cracked and the mixture is maintained at 850° F. to 950° F. and preferably about 900° F. until the desired degree of cracking or conversion to gasoline is obtained. The oil stock charged to the cracking unit may be gas oil, selective solvent purified hydrocarbon oils, propane-deasphaltized oils, recycle cracked gas oil, etc., the nature of the charge oil having little or no significance insofar as the present invention is concerned.

We have found that a friable, solid bottoms or distillation residue and a heavy distillate fraction obtainable from slurry oil, i. e., the bottoms from a catalytic cracking process, are excellent additives for natural rubber and synthetic polymers, particularly butadiene-styrene rubbers, and have the unusual effect of increasing the tensile and tear strengths of rubber-like materials, and at the same time exerting a plasticizing and softening action. These effects, accompanied by a flatter cure, are not limited to any one formula, but are obtained with different accelerators.

In the catalytic cracking of hydrocarbon oil to produce motor fuel, particularly when using powdered catalysts, there is obtained as a by-product, a heavy oil residue containing entrained catalyst. To remove the catalyst, the oil is usually permitted to remain quiescent for a sufficient period of time to allow the catalyst particles to settle out, at which time the oil substantially free of catalyst may be decanted. However, in lieu of settling, the catalyst particles may be filtered or centrifuged from the oil, or such operations may be used in conjunction with settling. In any case, there is obtained a clarified slurry oil having an A. P. I. gravity between 10° and 18° (specific gravity 1.00 to 0.945), a distillation range between 350° F. and 900° F. at atmospheric pressure (100° F. to 650° F. at 3 mm. pressure), and a Saybolt universal viscosity at 210° F. between 30 and 60 seconds.

This slurry oil is then subjected to distillation to obtain the fractions it is desired to use as plasticizers and softeners. To this end, the slurry oil may be distilled at atmospheric pressure to a maximum temperature of about 650° F., taking overhead the lower boiling fractions such as gas oil and the like usually amounting to 20 percent to 30 percent of the charge oil. The distillation pressure is then reduced, for example, to about 3 mm., and an additional quantity of more viscous oil is distilled off. Depending upon the nature of the slurry oil and upon the properties required in the plasticizers, the total quantity of oil distilled off and discarded may range from about 70 percent to 95 percent of the charge oil. Furthermore, the distillation operation may be carried out entirely at reduced pressure, rather than in two stages, the first at atmospheric pressure and the second at low pressure. Since it has been found that the last overhead fraction constituting from 5 percent to 15 percent of the charge, and the friable distillation residue also comprising from 5 percent to 15 percent of the charge both have desirable plasticizing properties, the distillation may be conducted in such a manner that the last overhead fraction and the residue may be segregated, or the distillation may be cut short, thereby leaving the material normally constituting the last overhead fraction as part of the residue or distillation bottoms. For ease in handling in compounding with rubber-like materials, it is usually advantageous to segregate the last overhead fraction and the bottoms, and to use either one or both, as desired. For example, a clarified slurry oil having the properties set forth hereinbefore is distilled at a reduced pressure of 3 mm., and the overhead fractions distilling up to about 500° F. or 520° F. (vapor temperature) at 3 mm. are discarded. The heavy distillate thereafter taken overhead to a temperature of about 570° F. and constituting from 5 percent to 15 percent of the charge has been found suitable as a plasticizing and softening agent. This heavy distillate has a specific gravity at 60° F. between 1.00 and 1.15, a distillation range of about 475° F. to 570° F. at 3 mm., a Saybolt Universal viscosity at 210° F. between 70 and 110 seconds, and a flash point of at least 375° F. The residue or distillation bottoms, constituting from 5 percent to 15 percent of the charge depending upon the characteristics thereof, constitutes a hard, friable solid having a specific gravity at 60° F. between 1.10 and 1.30, a softening point (ring and ball) between 180° F. and 210° F., a Furol viscosity at 325° F. between 30 and 60 seconds, a flash point of at least 600° F., and an aniline point below 70° F. This residue is likewise an excellent plasticizer and softener for rubber-like materials, and in some respects is superior to the heavy distillate for such purposes. In certain instances, it may be desirable to conduct the distillation in such a manner that the last overhead fraction, i. e., the heavy distillate, is not segregated from the residue. In this case, all fractions boiling up to about 500° F. at 3 mm. taken overhead are discarded and the distillation is stopped. The distillation residue thus contains the last distillate fraction which would normally have been taken overhead, and such residue amounting to between 10 percent and 30 percent of the charge, depending upon the characteristics of the charge, usually has a specific gravity at 60° F. between 1.05 and 1.25, and a distillation overpoint of about 475° F. at 3 mm. The viscosity, softening point, flash point, aniline number and other properties are intermediate those of the heavy distillate and the hard, friable bottoms described above. For example, the Saybolt Universal viscosity at 210° F. may range from 700 to 1000 seconds, the softening point from 90° F. to 130° F., the flash point from 400° F. to 475° F., and the aniline point below 40° F.

By way of illustration, a clarified slurry oil having a Saybolt Universal viscosity at 210° F. of 46 seconds and an A. P. I. gravity at 60° F. of 16.2° (specific gravity 0.958) was distilled at 3 mm. pressure to obtain a last heavy overhead fraction representing 5.7 percent of the charge oil and a distillation residue or bottoms representing 7.6 percent of the charge. Upon mixing the overhead fraction with the bottoms, there was obtained a product having a softening point of 104° F., a Saybolt Universal viscosity at 210° F. of 840 seconds, a specific gravity of 1.16 at 60° F., a flash point of 430° F., and an aniline point below 40° F.

When the heavy distillate is segregated for use as a plasticizer, it is in some cases necessary to treat same for the removal of wax, in the event that the original slurry oil was obtained by the catalytic cracking of waxy petroleum oils. Such wax removal may be effected by any of the known methods of solvent dewaxing using solvents such as acetone-benzol, methyl ethyl ketone-benzol, liquid propane, ethylene dichloride, or the like. For example, the heavy distillate may be mixed with an equal volume of acetone-benzol, the mixture cooled to 60° F. or lower, the crystallized wax filtered off. In the event that the viscosity of the heavy distillate is too great for ready handling in compounding with rubber-like materials, such distillate may be diluted with a small amount, for example, 10 percent to 15 percent by weight, of an aromatic hydrocarbon solvent having a boiling point above about 350° F. Such solvents are exemplified by diisopropyl and triisopropyl benzene, the butyl benzenes, the amyl benzenes, the hexyl benzenes, and coal tar solvent naphthas rich in aromatic hydrocarbons. Stable halogenated alkyl benzenes may also be used. However, in most cases about 10 percent to 12 percent of diisopropyl benzene has been found very satisfactory, and is not too volatile in milling and vulcanizing operations.

The present invention may be further illustrated by the following examples, which, however, are not to be construed as limiting the scope thereof.

An East Texas gas oil was cracked in a commercial fluid catalytic cracking plant using a powdered silica-alumina catalyst at 900° F. From the cracked products was separated a slurry oil having an A. P. I. gravity of 14° and a distillation range of 100° F. to 650° F. at 3 mm. The slurry oil was distilled at 3 mm. pressure, and there was obtained a heavy distillate fraction comprising the last 5 percent of the charge taken over head and a residue or bottoms comprising the last 5 percent of the charge. The distillate fraction was dewaxed by diluting with an equal volume of acetone-benzol (35 percent to 65 percent mixture), cooling to 60° F., and filtering off the crystallized wax. The dewaxed distillate, after removal of acetone-benzol by distillation, was diluted with 11.4 percent by weight of diisopropyl benzene, and the resulting mixture had a specific gravity of 1.112 at 82° F. and a Saybolt Universal viscosity at 210° F. of 70 seconds.

The residue or bottoms from the distillation of the slurry oil had the following properties:

| | |
|---|---|
| Specific gravity at 60° F | 1.210. |
| Softening point (R. & B.) | 190° F. |
| Penetration at 77° F | 2. |
| Penetration at 115° F | 4. |
| Furol viscosity at 325° F | 45 sec. |
| Flash point | 610° F. |
| Refractive index at 176° F | 1.6778. |
| Aniline point | Below 50° F. |
| Iodine number | 101. |
| Solubility in benzene | Completely. |
| Solubility in acetone | Partially. |
| Solubility in 88° naphtha | Partially. |
| Solubility in diethyl ether | Partially. |
| Solubility in ethyl alcohol | Partially. |

The results obtained in compounding these additives with GR-S rubbers (butadiene-styrene) of two different formulae are given in the following tables.

The rubber formulae are:

| | Formula A | Formula B |
|---|---|---|
| GR-S Rubber | 100.00 | 100.00 |
| EPC Black | 50.00 | 50.00 |
| Zinc Oxide | 5.00 | 5.00 |
| Sulfur | 1.75 | 2.00 |
| Mercaptobenzothiazole-cyclo-hexylamine condensation product | 1.00 | 0.00 |
| Mercaptobenzothiazole | 0.00 | 1.25 |
| DPG | 0.00 | 0.25 |

The distillation residue was added in amounts equal to 10 percent and 20 percent by weight based upon the GR-S rubber, while the heavy distillate was added in amounts equal to 5 percent to 10 percent by weight based on the rubber.

| Properties | Formula A | | | Formula B | | |
|---|---|---|---|---|---|---|
| | Blank | 10% Dist. Residue | 20% Dist. Residue | Blank | 10% Dist. Residue | 20% Dist. Residue |
| Tensile Strength: | | | | | | |
| p. s. i. at 80°F., 45' cure | 2,530 | 3,150 | 2,580 | 2,705 | 3,050 | 3,070 |
| p. s. i. at 80°F., 75' cure | 2,655 | 3,045 | 2,450 | 2,525 | 3,035 | 3,100 |
| p. s. i. at 210°F., 45' cure | 1,125 | 1,065 | 800 | 1,150 | 990 | 900 |
| p. s. i. at 210°F., 75' cure | 975 | 1,040 | 910 | 1,120 | 980 | 830 |
| 300 percent Modulus: | | | | | | |
| p. s. i., 45' cure | 1,015 | 610 | 330 | 1,495 | 855 | 430 |
| p. s. i., 75' cure | 1,305 | 700 | 400 | 1,810 | 1,020 | 500 |
| Elong. at break, percent 45' cure | 545 | 765 | 890 | 455 | 635 | 830 |
| Elong. at break percent 75' cure | 485 | 700 | 840 | 380 | 595 | 800 |
| Tear Strength: | | | | | | |
| Pounds per inch, 30' cure | 275 | 405 | 275 | 415 | 385 | 295 |
| Pounds per inch, 45' cure | 345 | 385 | 285 | 350 | 405 | 300 |

|  | Formula A ||| Formula B |||
|---|---|---|---|---|---|---|
|  | Blank | 5% Hy. Dist. | 10% Hy. Dist. | Blank | 5% Hy. Dist. | 10% Hy. Dist. |
| Tensile Strength: | | | | | | |
| p. s. i. at 80°F., 45' cure | 2,465 | 2,625 | 2,655 | 2,695 | 2,730 | 2,700 |
| p. s. i. at 80°F., 75' cure | 2,685 | 2,810 | 2,805 | 2,615 | 3,130 | 2,950 |
| p. s. i. at 210°F., 45' cure | 1,055 | 1,005 | 925 | 1,155 | 1,160 | 955 |
| p. s. i. at 210°F., 75' cure | 1,050 | 1,080 | 845 | 1,105 | 1,145 | 1,005 |
| 800 percent Modulus: | | | | | | |
| p. s. i., 45' cure | 895 | 660 | 430 | 1,435 | 930 | 620 |
| p. s. i., 75' cure | 1,195 | 830 | 630 | 1,775 | 1,065 | 735 |
| Elong. at break, percent 45' cure | 550 | 640 | 780 | 460 | 590 | 670 |
| Elong. at break, percent 75' cure | 495 | 610 | 700 | 395 | 575 | 665 |
| Tear Strength: | | | | | | |
| Pounds per inch, 30' cure | 275 | 320 | 300 | 360 | 415 | 355 |
| Pounds per inch, 45' cure | 385 | 425 | 360 | 330 | 440 | 415 |

From the above data, it will be seen that the distillation residue, as well as the heavy distillate produced from residual oil from a catalytic cracking process both function as excellent additive agents for rubber. In producing these agents, it has been found that the source of the oils charged to the catalytic cracking process is of minor importance, since the cracking process itself produces residual oils from which rubber additives bearing the characteristics described herein may be derived. In general, the quantity of additive used in compounding with the rubber-like materials may range from 2 percent to 25 percent, the preferred range being from 5 percent to 15 percent by weight.

We claim:

A composition comprising a butadiene-styrene rubber and from 2 percent to 25 percent of a plasticizing and softening agent produced by contacting gas oil with a silica-alumina catalyst at a temperature ranging between 850° F. and 950° F. to crack the gas oil, separating from the cracked hydrocarbons, catalyst and heavy residual oil having an A. P. I. gravity between 10° and 18°, a distillation range of 100° F. to 650° F. at 3 mm. pressure, and a Saybolt Universal viscosity at 210° F. of 30 to 60 seconds, distilling said heavy residual oil at subatmospheric pressures to produce the desired residue having a specific gravity at 60° F. between 1.10 and 1.30, a softening point between 180° F. and 210° F., a penetration at 77° F. of about 2, a penetration at 115° F. of about 4, a flash point of at least 600° F., a Furol viscosity at 325° F. between 30 and 60 seconds and aniline point below 70° F.

References Cited in the file of this patent

UNITED STATES PATENTS

| | | |
|---|---|---|
| 1,611,436 | Hall | Dec. 21, 1926 |
| 2,323,336 | Knorr | July 6, 1943 |
| 2,324,980 | Kilbourne | July 20, 1943 |
| 2,470,141 | Caves | May 17, 1949 |